United States Patent
Noshiro et al.

(10) Patent No.: US 12,285,809 B2
(45) Date of Patent: Apr. 29, 2025

(54) HARD-FILM-COATED DRILL

(71) Applicant: NACHI-FUJIKOSHI CORP., Tokyo (JP)

(72) Inventors: Junichi Noshiro, Toyama (JP); Ryo Hayashi, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 935 days.

(21) Appl. No.: 17/225,351

(22) Filed: Apr. 8, 2021

(65) Prior Publication Data

US 2021/0291279 A1     Sep. 23, 2021

Related U.S. Application Data

(63) Continuation of application No. PCT/JP2019/039597, filed on Oct. 8, 2019.

(30) Foreign Application Priority Data

Oct. 11, 2018   (JP) .................................. 2018-192830

(51) Int. Cl.
    *B23B 51/02*      (2006.01)
    *C23C 28/04*      (2006.01)

(52) U.S. Cl.
    CPC ............ *B23B 51/02* (2013.01); *C23C 28/044* (2013.01); *B23B 2224/08* (2013.01);
    (Continued)

(58) Field of Classification Search
    CPC . B23B 51/02; B23B 2224/08; B23B 2224/36; B23B 2228/10; B23B 2228/105;
    (Continued)

(56) References Cited

U.S. PATENT DOCUMENTS 4,983,079 A * 1/1991 Imanaga ................. B23B 51/02
                                                        408/230
5,230,593 A * 7/1993 Imanaga ................. B23B 51/02
                                                        408/230
(Continued)

FOREIGN PATENT DOCUMENTS

CN        104960276 A      10/2015
DE       19511828 A1 * 10/1996 ............. B23B 51/02
(Continued)

OTHER PUBLICATIONS

EPO Machine Translation of CN104960276A—Jin-Zhang-bin; "Surface Coating and Drill for Machining Door Hinge"; Oct. 7, 2015.*
(Continued)

*Primary Examiner* — Aneeta Yodichkas
*Assistant Examiner* — Michael Vitale
(74) *Attorney, Agent, or Firm* — Harness, Dickey & Pierce, P.L.C.

(57) ABSTRACT

In a hard-film-coated drill having a cemented carbide drill body coated with a hard film, the drill body is provided with a smooth region at a boundary between a flank surface and a rake surface. The surface hardness of the hard film is within 2000 to 2500 HV in Vickers hardness. A radius r1 (μm) of curvature of the first ridgeline L1 where the smooth region and the flank surface intersect is represented by r1=0.45×D+a1 (10≤a1≤25), where D is the diameter (mm) of the body. A radius r2 (μm) of curvature the second ridgeline L2 where the flank surface and a margin intersect is represented by r2=0.65×D+a2 (39≤a2≤67). A thickness t1 (μm) of the hard film is represented by t1=0.8×ln(D)+a3 (0.7≤a3≤3.0).

4 Claims, 18 Drawing Sheets

(52) U.S. Cl.
CPC ..... *B23B 2224/36* (2013.01); *B23B 2228/105* (2013.01); *B23B 2251/125* (2013.01); *Y10T 408/89* (2015.01)

(58) Field of Classification Search
CPC ............ B23B 2251/125; Y10T 408/89; C23C 28/044; C23C 28/42
USPC ........................................................ 408/199
See application file for complete search history.

(56) References Cited

U.S. PATENT DOCUMENTS

| | | | | |
|---|---|---|---|---|
| 6,132,149 | A * | 10/2000 | Howarth | E21B 10/44 408/229 |
| 6,315,504 | B1 * | 11/2001 | Sekiguchi | B23B 51/02 408/229 |
| 9,211,588 | B2 * | 12/2015 | Setoyama | B23C 5/16 |
| 2017/0129818 | A1 * | 5/2017 | Nii | C23C 28/42 |
| 2017/0274460 | A1 * | 9/2017 | Jindai | B23B 51/02 |
| 2019/0061013 | A1 * | 2/2019 | Hirano | C23C 14/0641 |
| 2021/0069794 | A1 * | 3/2021 | Fukui | C23C 14/0664 |

FOREIGN PATENT DOCUMENTS

| | | |
|---|---|---|
| JP | 2000-038663 A | 2/2000 |
| JP | 4967505 B2 | 7/2012 |
| JP | 2014-018883 A | 2/2014 |
| JP | 2014069258 A * | 4/2014 |
| JP | 6222675 B2 | 11/2017 |
| KR | 19980703502 A * | 11/1998 |
| WO | 2016-043098 A1 | 3/2016 |

OTHER PUBLICATIONS

International Search Report for corresponding International Application No. PCT/JP2019/039597 dated Nov. 26, 2019 (4 pages).

* cited by examiner

HARD-FILM-COATED DRILL

CROSS REFERENCE TO RELATED APPLICATION

This application is a continuation of International Patent Application No. PCT/JP2019/039597, having an international filing date of Oct. 8, 2019, which designated the United States, the entirety of which is incorporated herein by reference. Japanese Patent Application No. 2018-192830 filed on Oct. 11, 2018 is also incorporated herein by reference in its entirety.

BACKGROUND

The present disclosure relates to a cutting tool (drill) coated with a hard film such as TiN (titanium nitride).

In general, a cutting tool such as a drill is used in a state in which a surface of a base material (material) made of a cemented carbide is coated with a hard film such as TiN.

With the hard film coating, progression of wear of the base material during cutting is reduced, and damage to the cutting tool is prevented.

Moreover, by arranging the hard film to contain a wide variety of elements such as Cr and Si in addition to TiN (titanium nitride) in arbitrary proportions, it is possible to impart various characteristics to the hard film.

JP-B-6222675 and JP-B-4967505 disclose stacking two kinds of hard films having mutually different component ratios alternately in multiple layers at an intermediate position in a usual hard film, and thereby improving wear resistance and chipping resistance of the hard film as a whole.

In addition to the hard film, as for the form of a cutting tool, by forming a flank surface and a rake surface in specific shapes, wear of the cutting tool during cutting can be reduced.

Moreover, chipping during cutting can be prevented by forming a chamfer surface (flat chamfer) on a cutting tip.

Furthermore, by performing minute round-chamfering on the edge portion of the cutting tip irrespective of the presence or absence of the chamfer surface, it is possible to prevent chipping and peeling of the film at the edge portion.

JP-A-2014-18883 and WO-A-2016-043098 publications disclose reducing wear of a cutting tool by forming a honing surface (also called a chamfer surface) at a cutting edge of the cutting tool and further performing round-chamfering in a predetermined range on an outer peripheral corner between a flank surface and a margin.

However, there was a problem for making the length of the radius of curvature of the round chamfer at the edge portion of the cutting tip uniform regardless of the size (diameter) of the cutting tool when coating the surface of the cutting tool with the hard film.

If hole drilling is performed under general cutting conditions, as the diameter of the cutting tool (drill) increases, the cutting resistance caused on the drill during cutting increases and a force exerted on the cutting tip increases, and consequently chipping easily occurs at the cutting tip.

Therefore, with an increase in the tool diameter, it is necessary to increase the chamfer amount (width).

For the same reason, in order to prevent film destruction (self-destruction of the hard film) at the edge portion of the cutting tip due to external force during cutting, it is necessary to increase the radius of curvature of the edge portion.

For example, if the radius of curvature is small relative to the diameter of the cutting tool, when a conventional cutting tool 100 is coated with a hard film after forming a chamfer surface 104 in the vicinity of the cutting edge (a boundary portion between a flank surface 102 and a rake surface 103) as illustrated in FIG. 19 and hole drilling is performed, destruction of the hard film occurs from a part of a ridgeline between the flank surface 102 and the chamfer surface 104 and from a part of a leading edge 107.

Damage such as chipping and wear of the flank surface of the cutting tool may progress from such a part, which results in chips c1 to c3 (see FIG. 20).

Conversely, if the radius of curvature of a round chamfer at the edge portion of the cutting tip is large relative to the diameter of the cutting tool, the radius of curvature of the round chamfer is excessively large relative to the cutting conditions, and the cutting resistance occurring during hole drilling increases.

As a result, the cutting sharpness of the drill deteriorates, and the quality of processing is impaired. In addition, the cutting tool cannot withstand the resistance occurring during processing, and breakage of the cutting tool is likely to occur.

Therefore, the disclosure addresses the problem of providing a hard-film-coated drill that has improved adhesion between a base material (drill body) and a hard film by optimizing round-chamfering to a ridgeline forming a cutting edge of the drill and the hardness of the hard film to reduce film destruction at the edge portion of a cutting tip, according to characteristics of the hard film coating.

DESCRIPTION OF EXEMPLARY EMBODIMENTS

Figure 1:
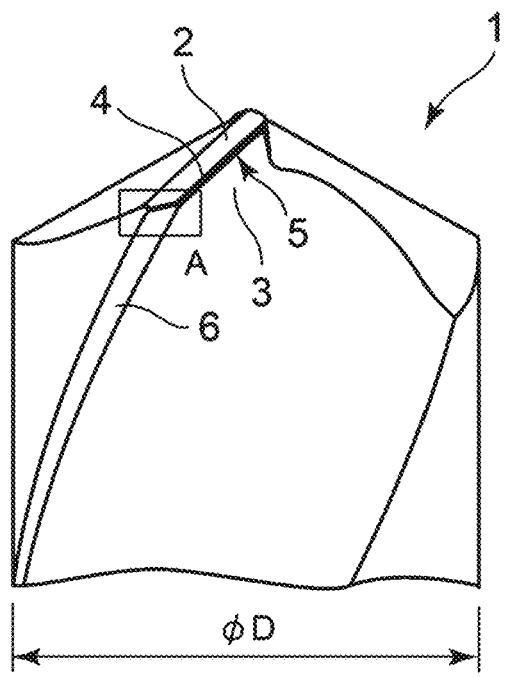
FIG. 1 is a front view of a hard-film-coated drill body 1 of the disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between. Further, when the first element is described as "moving" relative to the second element, such description includes embodiments in which at least one of the first element and the second element moves relative to the other.

In order to solve the above-described problem, the present inventor eagerly conducted research on the relationship between the characteristics of the hard film and the drill body, and, as a result, reached the following findings.

That is, self-destruction of the hard film at the edge portion of the cutting tip is caused by residual stress in the hard film, and the residual stress is greatly related with the thickness and hardness of the film.

Therefore, when coating the drill body with a hard film having high hardness (for example, exceeding 2500 HV in Vickers hardness), it is necessary to prevent self-destruction of the hard film by optimizing the thickness of the hard film relative to a change in the diameter of the drill body.

Figure 21:
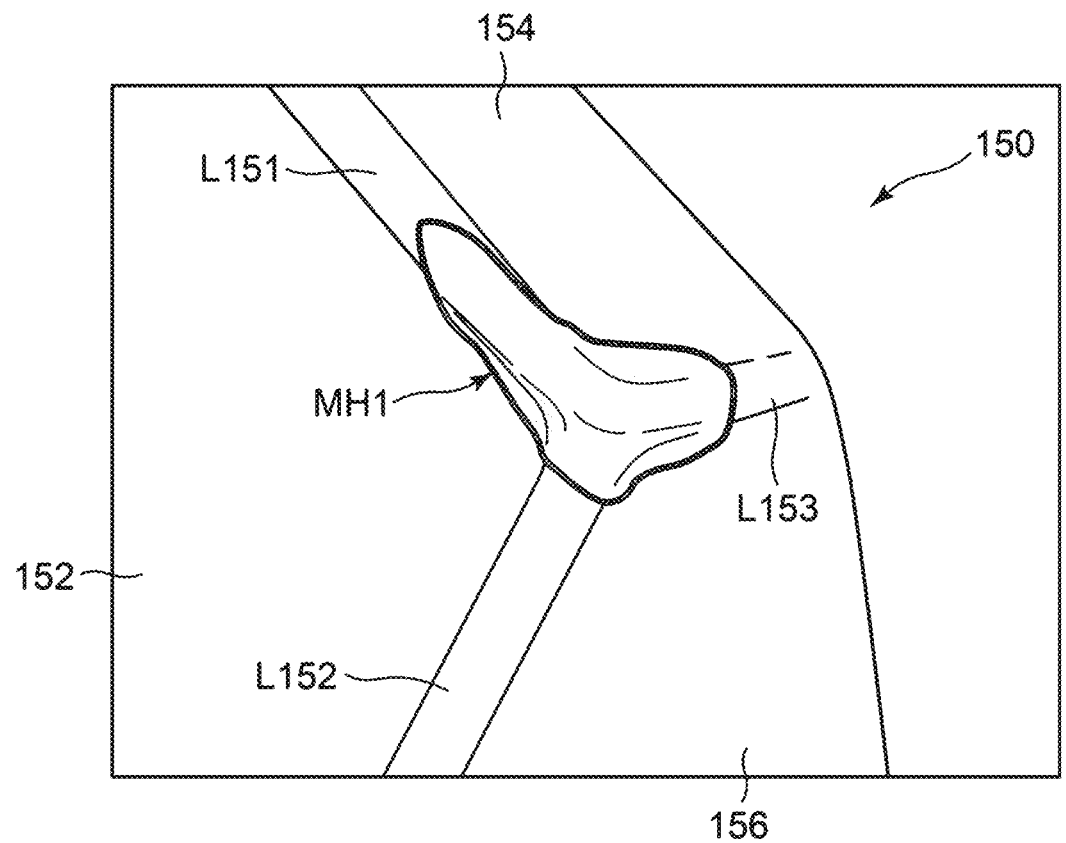
FIG. 21 is an enlarged schematic view illustrating the state of self-destruction MH1 (the first form) of a hard film of a conventional drill 150.
Figure 22:
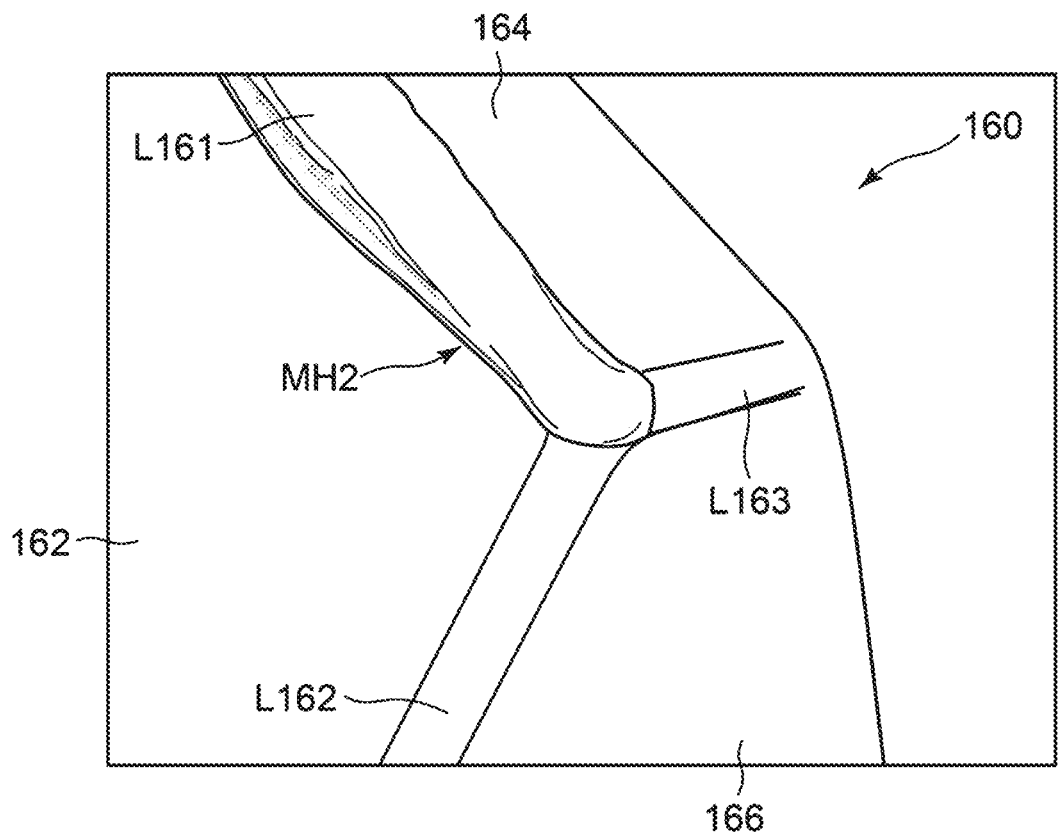
FIG. 22 is an enlarged schematic view illustrating the state of self-destruction MH2 (second form) of a hard film of a conventional drill 160.

Here, typical forms of self-destruction of the hard film of conventional drills are illustrated in FIG. 21 and FIG. 22.

As a first form of self-destruction of the hard film, there is peeling of the hard film (a peeled portion MH1) around a point where a first ridgeline L151 as a boundary between a flank surface 152 and a chamfer surface 154 of a drill 150, a second ridgeline L152 as a boundary of a margin 156, and a third ridgeline L153 as a boundary between the chamfer surface 154 and the margin 156 intersect as illustrated in FIG. 21.

As a second form, there is peeling of the hard film (a peeled portion MH2) around a point where a first ridgeline L161 from a point where the first ridgeline L161 as a boundary between a flank surface 162 and a chamfer surface 164 of a drill 160, a second ridgeline L162 as a boundary of a margin 166, and a third ridgeline L163 as a boundary between the chamfer surface 164 and the margin 166 intersect, and along the first ridgeline L161 as illustrated in FIG. 22.

On such ridgelines to be corners where a surface and a surface intersect, residual stress in the hard film is likely to be concentrated, and the stress becomes larger with an increase in the thickness of the hard film, and consequently self-destruction is likely to occur prior to other points.

The film may self-destruct not only in the first and second forms, but also in a continuous or non-continuous form on any ridgelines, or at any points where the ridgelines intersect.

That is, if the coating of the hard film having high hardness on the drill body is thicker than necessary, self-destruction of the hard film occurs due to the difference in residual stress between the base material and the hard film, and the self-destruction causes exposure of the base material and progression of wear.

Therefore, when coating a cutting tool with a hard film, it is necessary to select a film thickness according to the diameter of the cutting tool.

In general, an increase in the hardness of the hard film improves wear resistance of the cutting tool, but the hard film having high hardness can be a cause of self-destruction, and additionally the increase in the film thickness further increases the possibility of self-destruction accordingly.

Hence, in order to coat the base material (drill body) with a hard film having a certain thickness, it is necessary to adjust the hardness of the hard film to relatively low hardness (equal to or less than 2500 HV) for the purpose of reducing self-destruction of the hard film, and to optimize the shape of the drill body.

Therefore, in the disclosure, in a hard-film-coated drill having a cemented carbide drill body with a surface coated with a hard film, the drill body is provided with a smooth region (smooth surface) at a location where a flank surface and a rake surface intersect.

Two ridgelines, namely a first ridgeline where the smooth surface and the flank surface intersect and a second ridgeline where the flank surface and a margin intersect, are processed in a round shape in cross section (round-chamfering).

In this case, the hardness of the hard film that coats the drill body is within a range of 2000 to 2500 HV in Vickers hardness.

In round-chamfering, a radius $r_1$ (in μm) of curvature of the first ridgeline is within a range represented by a formula $r_1=0.45\times D+a_1$ ($10\leq a_1\leq 25$), where D is the diameter (in mm) of the drill body.

In addition, a radius $r_2$ (in μm) of curvature of the second ridgeline is within a range represented by a formula $r_2=0.65\times D+a_2$ ($39\leq a_2\leq 67$).

Furthermore, a thickness $t_1$ (in μm) of the hard film that coats the surface of the cemented carbide drill body can be within a range represented by a formula $t_1=0.8\times \ln(D)+a_3$ ($0.7\leq a_3\leq 3.0$), where D is the diameter (in mm) of the drill body.

Here, "ln" means the natural logarithm with the base "e".

The hard film roughly includes a first layer, a second layer, and a third layer in this order from the drill body side. As for the film composition, the first layer can be a hard film composed mainly of a nitride (AlTiN) containing Al and Ti.

The second layer is a mixed layer in which two kinds of hard films having different compositions are alternately stacked.

The third layer is a hard film composed mainly of a nitride (TiSiN) containing Ti and Si.

Furthermore, the two kinds of hard films that form the second layer can be a first intermediate hard film composed mainly of a nitride (AlTiSiN) containing Ti, Al and Si, and a second intermediate hard film composed mainly of a nitride (AlTiSiCrN) containing Ti, Al, Cr and Si.

The hard-film-coated drill of the disclosure has improved adhesion between the base material of the hard-film-coated drill and the hard film by respectively optimizing round-chamfering to specific ridgelines that form the shape of the cutting edge, and the hardness and thickness of the hard film coating, according to the diameter of the drill body.

Thus, it is possible to prevent self-destruction of the hard film at the edge portion of the cutting tip irrespective of the diameter of the hard-film-coated drill, and to extend the tool life.

An embodiment of the hard-film-coated drill of the disclosure will be described below using the drawings.

Figure 2:
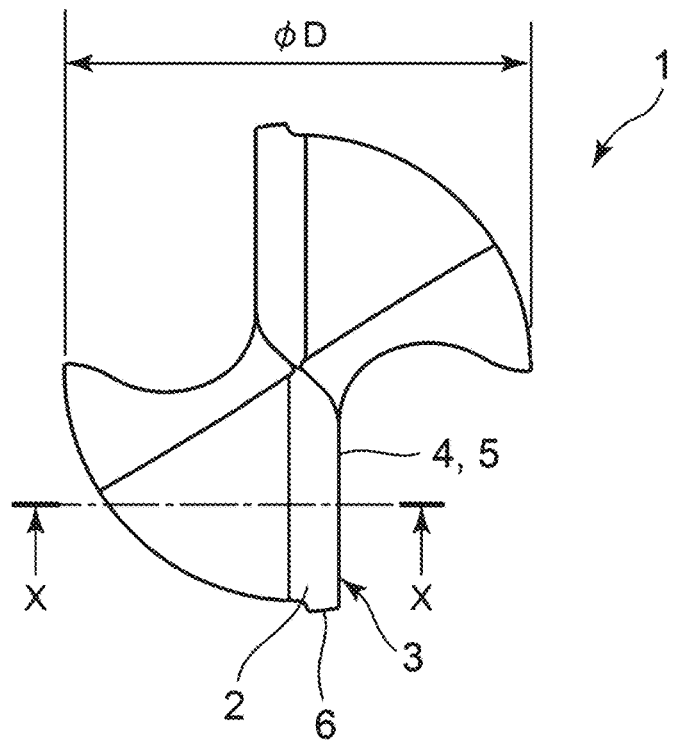
FIG. 2 is a plan view of the hard-film-coated drill body 1 of the disclosure.

FIG. 1 is a front view of a hard-film-coated drill body 1 as an embodiment of the disclosure, and FIG. 2 is a plan view thereof.

Figure 3:
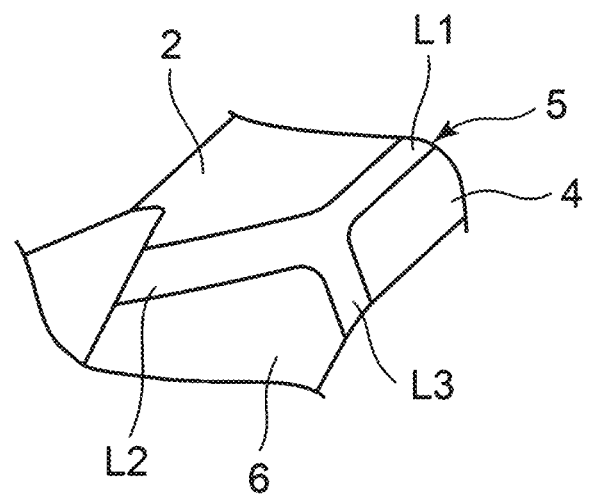
FIG. 3 is an enlarged view of the portion A of the drill body 1 illustrated in FIG. 1.
Figure 4:
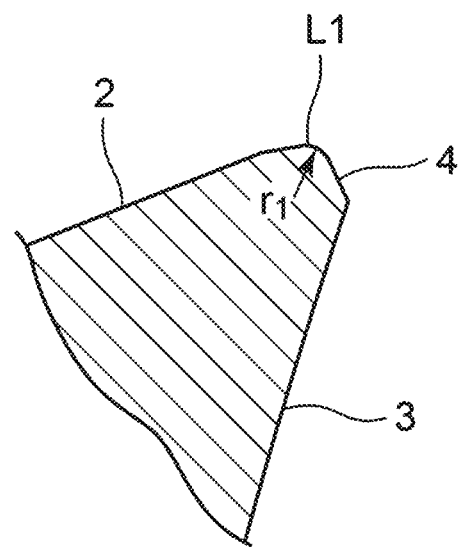
FIG. 4 is a cross sectional view taken along the line X-X of the drill body 1 illustrated in FIG. 2.

FIG. 3 is an enlarged view of the portion A in FIG. 1, and FIG. 4 is a cross sectional view taken long the line X-X in FIG. 2.

As illustrated in FIGS. 1 and 3, a region (smooth surface) 4 having a smooth surface from the center side toward the outer peripheral side of the drill body 1 is present between a flank surface 2 and a rake surface 3 of the drill body 1 (diameter ϕD) made of a cemented carbide of the disclosure.

This region 4 is formed by processing the tip of a cutting edge 5, and is called a honing surface or a chamfer surface, and continuously connected to or in contact with both the flank surface 2 and the rake surface 3.

Here, the "drill body" means the state of the drill material itself at a stage before being coated with a hard film, relative to the final form of the drill coated with a hard film such as TiN.

Therefore, in the present application, the "drill body" and the "hard-film-coated drill" as the final form in which the surface of the drill body is coated with the hard film are distinguished from each other.

Moreover, specific ridgelines of the drill body 1 are rounded (round chamfered) with predetermined radii of curvature in cross section.

The "specific ridgelines" mean a first ridgeline L1 where the region 4 and the flank surface 2 intersect, a second ridgeline L2 where the flank surface 2 and a margin 6 intersect, and a third ridgeline L3 where the margin 6 and the region 4 intersect as illustrated in FIG. 3.

FIG. 4 illustrates the vicinity of the first ridgeline L1 of the drill body 1 (X-X cross sectional view).

Figure 5:
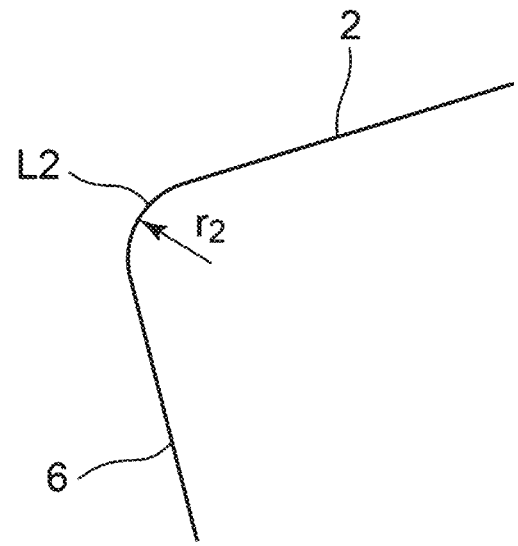
FIG. 5 is a schematic view of the vicinity of a second ridgeline L2 of the drill body 1.
Figure 6:
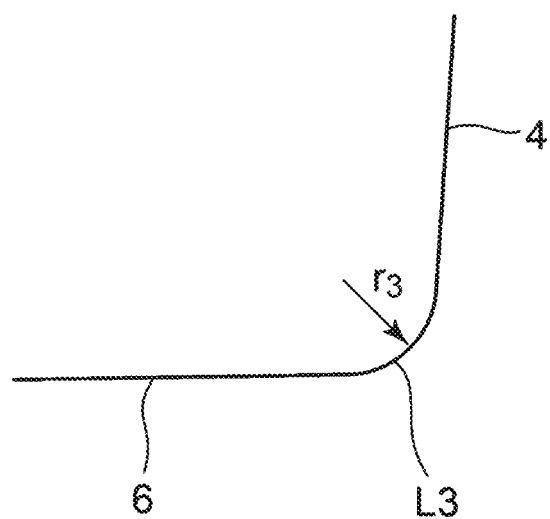
FIG. 6 is a schematic view of the vicinity of a third ridgeline L3 of the drill body 1.

FIG. 5 is a schematic view of the vicinity of the second ridgeline L2 of the drill body 1, and FIG. 6 is a schematic view of the vicinity of the third ridgeline L3 of the drill body 1.

These first to third ridgelines L1 to L3 are processed in a round shape (round chamfered) as illustrated in FIGS. 4 to 6.

In the round processing, the radius $r_1$ (μm) of curvature of the first ridgeline L1 is within a range represented by a numerical formula (hereinafter referred to as "Formula 1") $r_1=0.45 \times D+a_1$ ($10 \leq a_1 \leq 25$), where D is the diameter (mm) of the drill body 1 as illustrated in FIGS. 1 and 2.

In addition, the radius $r_2$ (μm) of curvature of the second ridgeline L2 is within a range represented by a numerical formula $r_2=0.65 \times D+a_2$ ($39 \leq a_2 \leq 67$) (hereinafter referred to as "Formula 2").

The radius $r_3$ of curvature of the third ridgeline L3 formed by the region 4 and the margin 6 is preferably within a range of from 25 μm inclusive to 50 μm inclusive.

Next, the hard film that coats the surface of the above-described drill body 1 will be described using the drawings.

Figure 7:
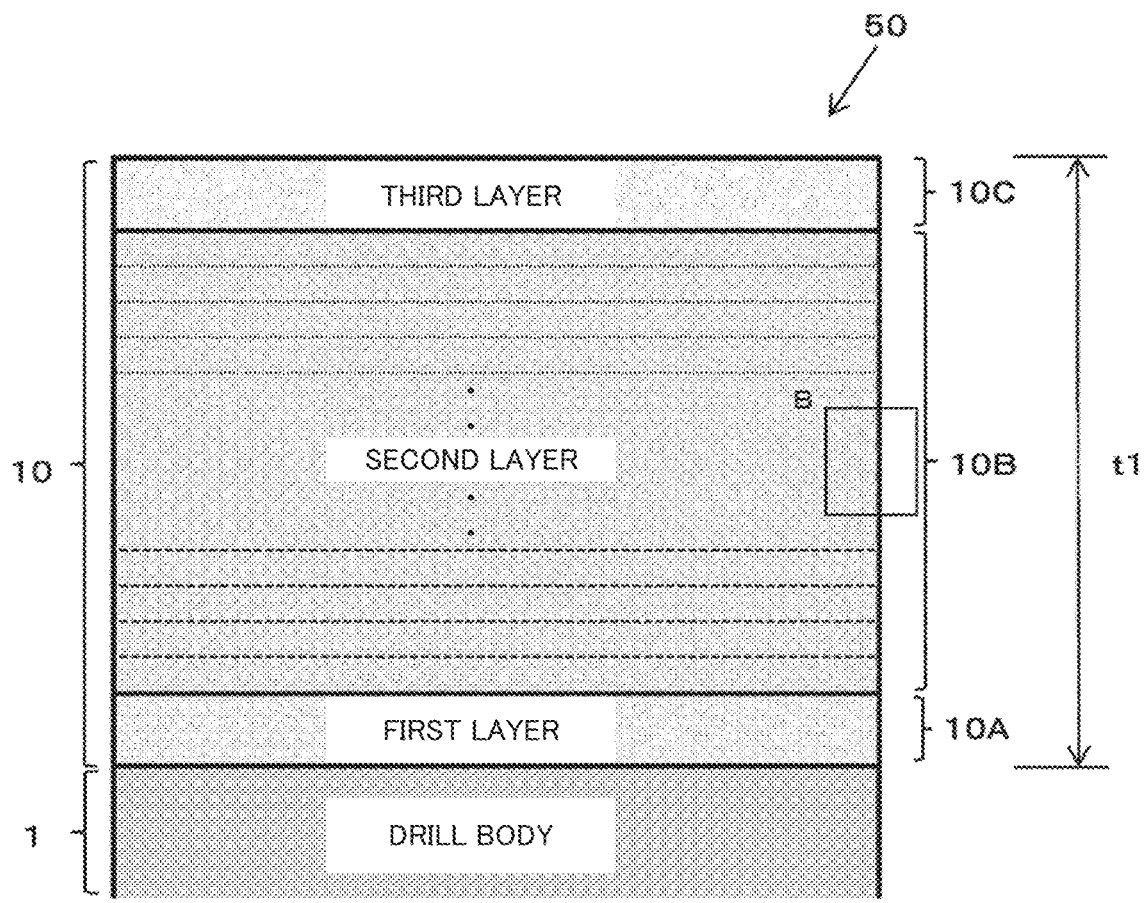
FIG. 7 is a schematic cross sectional view of a hard film 10 of a drill 50.
Figure 8:
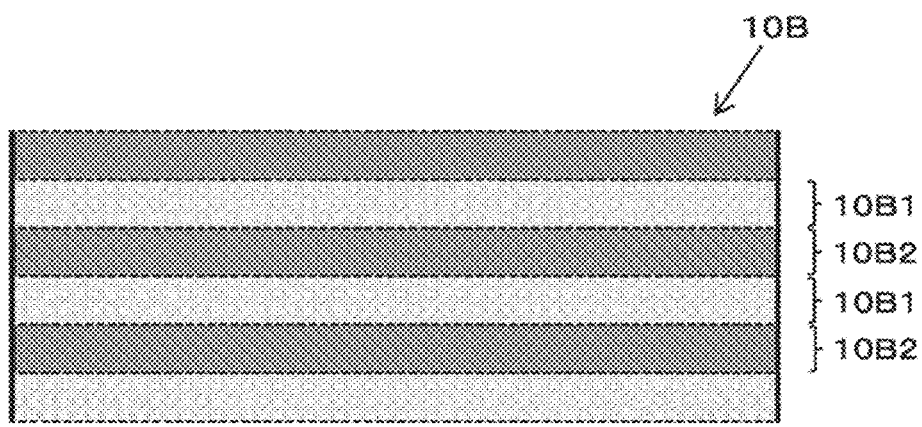
FIG. 8 is an enlarged view of the portion B of the hard film 10 illustrated in FIG. 7.
Figure 9:
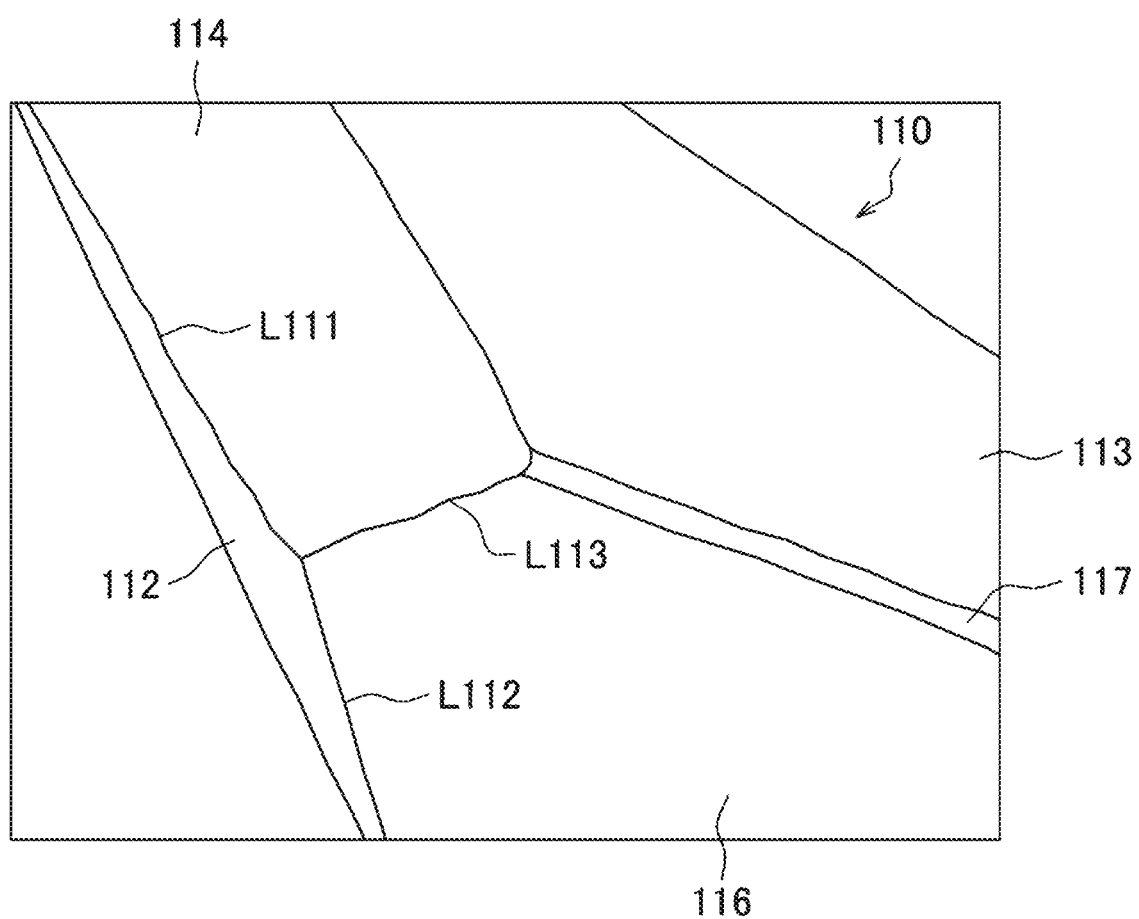
FIG. 9 is an enlarged schematic view (the rake surface side) of Comparative Example 1 (drill 110) to be compared with a first embodiment.
Figure 10:
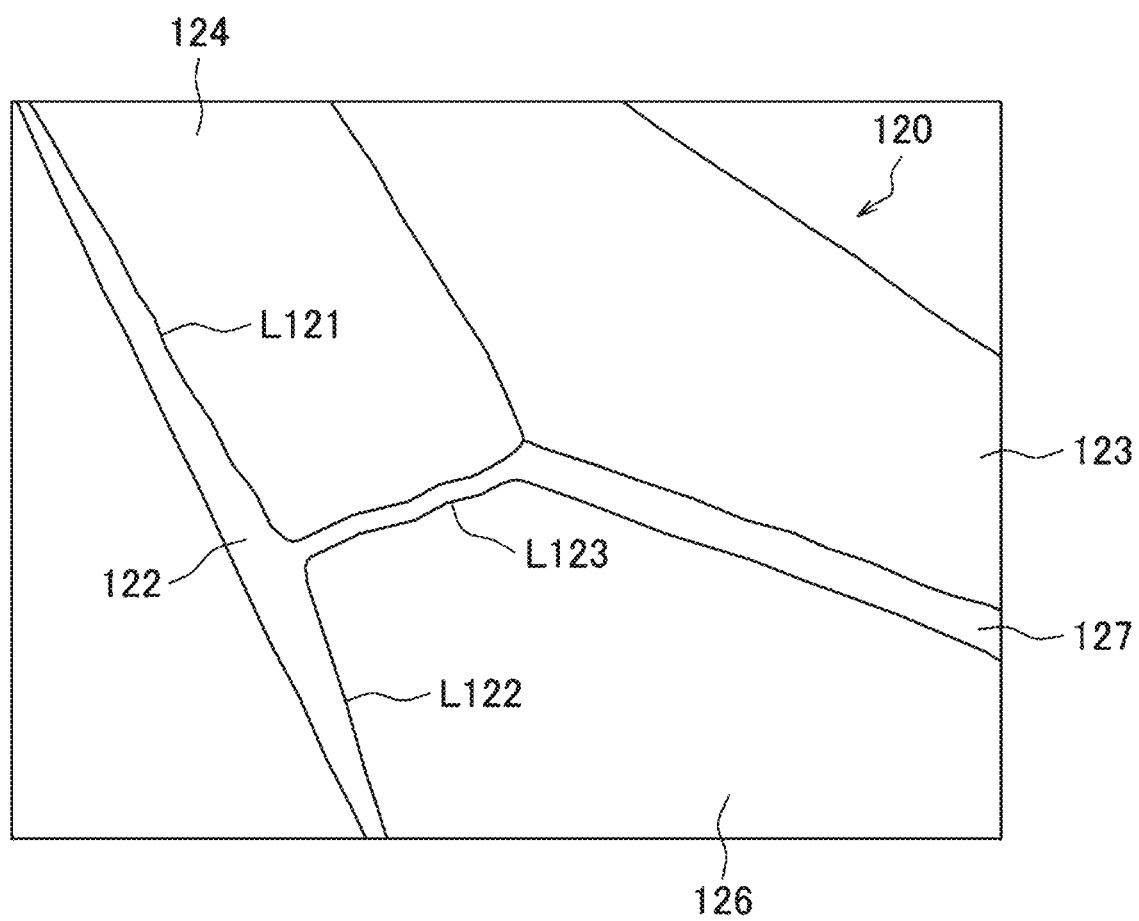
FIG. 10 is an enlarged schematic view (the rake surface side) of Comparative Example 2 (drill 120) to be compared with the first embodiment.
Figure 11:
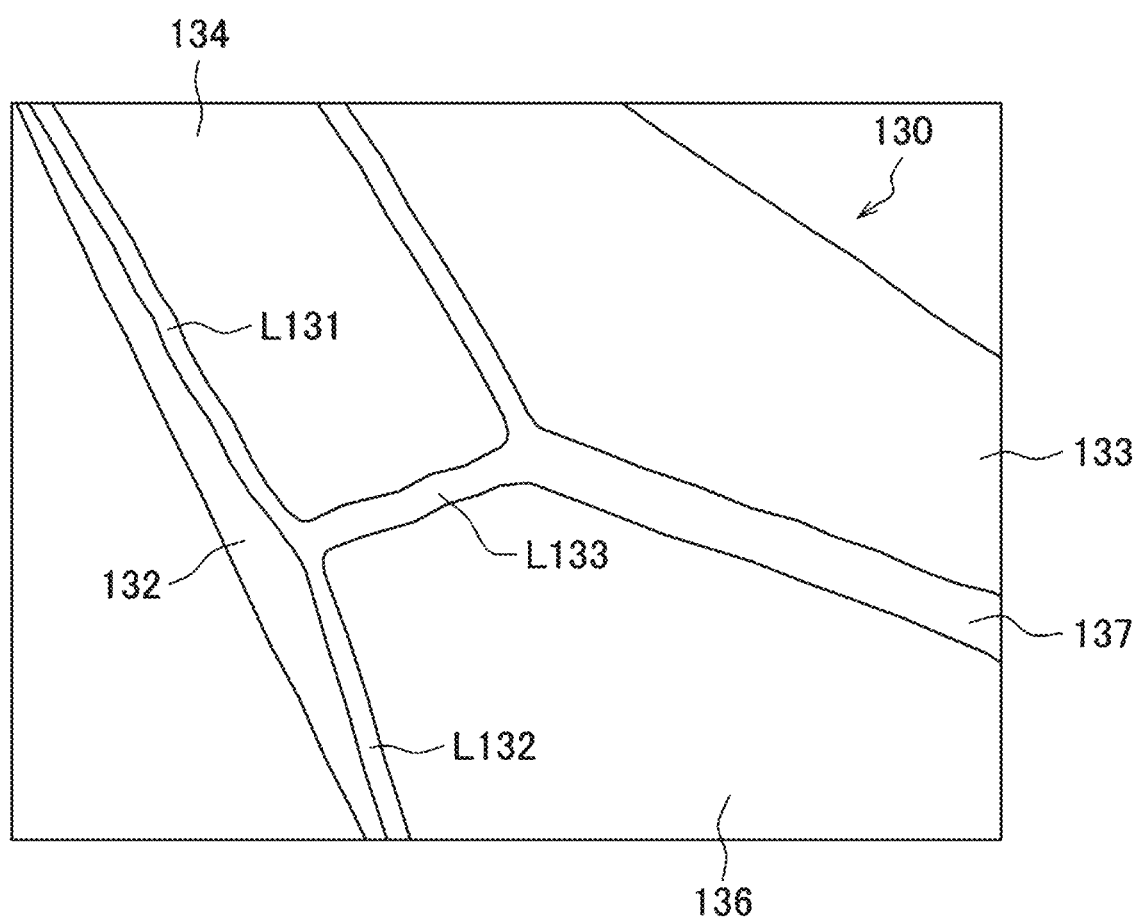
FIG. 11 is an enlarged schematic view (the rake surface side) of Comparative Example 3 (drill 130) to be compared with the first embodiment.

FIG. 7 is a schematic cross sectional view of a hard film 10 as a whole of a hard-film-coated drill 50, and FIG. 8 is an enlarged view of the portion B of the hard film 10 illustrated in FIG. 7.

In the hard film 10 that coats the surface of the hard-film-coated drill 50, as illustrated in FIG. 7, a first layer 10A equivalent to the lowermost layer, a second layer 10B equivalent to the intermediate layer, and a third layer 10C equivalent to the uppermost layer are stacked in this order from the drill body 1 side.

The surface hardness of the hard film 10 is within a range of 2000 to 2500 HV in Vickers hardness. The thickness $t_1$ (μm) of the hard film 10 is within a range represented by a numerical formula $t_1=0.8 \times \ln(D)+a_3$ ($0.7 \leq a_3 \leq 3.0$), where D (mm) is the diameter of the drill body 1 (hereinafter referred to as "Formula 3").

The first layer 10A that is the lowermost layer in the hard film 10 is a hard film coating at a position closest to the drill body 1, and the composition thereof is composed mainly of a nitride (AlTiN) containing Al and Ti.

The third layer 10C that is the uppermost layer in the hard film 10 is a hard film coating stacked on the first layer 10A and the second layer 10B, at a position most distant from the drill body 1, and the main component thereof is a nitride (TiSiN) containing Ti and Si.

The second layer 10B equivalent to the intermediate layer in the hard film 10 is a hard film stacked between the first layer 10A and the third layer 10C, and is a mixed layer in which two kinds of hard films having different compositions are alternately stacked.

The two kinds of hard films that form the second layer 10B are a first intermediate hard film 10B1 composed mainly of a nitride (TiAlSiN) containing Ti, Al and Si, and a second intermediate hard film 10B2 composed mainly of a nitride (TiAlCrSiN) containing Ti, Al, Cr and Si.

If a state in which one layer each of the first intermediate hard film 10B1 and the second intermediate hard film 10B2 are stacked is defined as one set (one cycle), the mixed layer that forms the second layer 10B is made by stacking a number of sets of the two kinds of hard films 10B1 and 10B2 within a range not less than 15 sets and not more than 60 sets, and the thickness is within a range of not less than 0.5 μm and not more than 5.0 μm.

First Embodiment

Cutting tests using two types of drills, namely drills according to a first embodiment (hereinafter referred to as the "example") and a conventional drill (hereinafter referred to as the "comparative example") were performed to confirm the relationship between the radii of curvature of the first to third ridgelines of the drill body and the tool life, and the test results are explained.

In both of the example and the comparative example, after performing round-chamfering on the drill body made of a cemented carbide with various radii of curvatures, the drill body was coated with a hard film.

The example and the comparative example had common specifications: drill body diameter: 6 mm; drill groove length: 42 mm; and drill length: 82 mm.

The radii $r_1$ to $r_3$ of curvature (the radii of curvature of the round chamfer) of the first to third ridgelines, the thickness and hardness of the hard film in Examples 1 to 3 and Comparative Examples 1 to 4 are as shown in Table 1.

Figure 12:
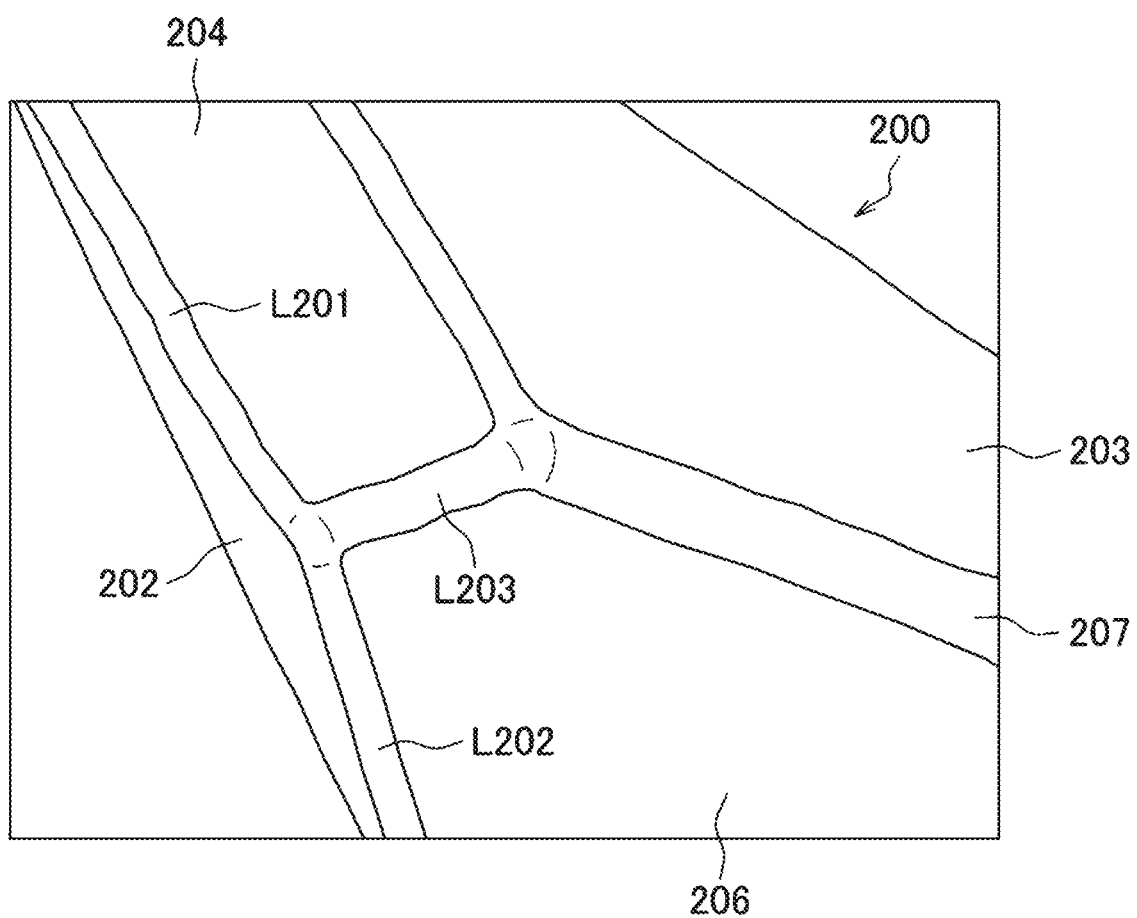
FIG. 12 is an enlarged schematic view (the rake surface side) of Example 1 (drill 200) of the first embodiment.
Figure 13:
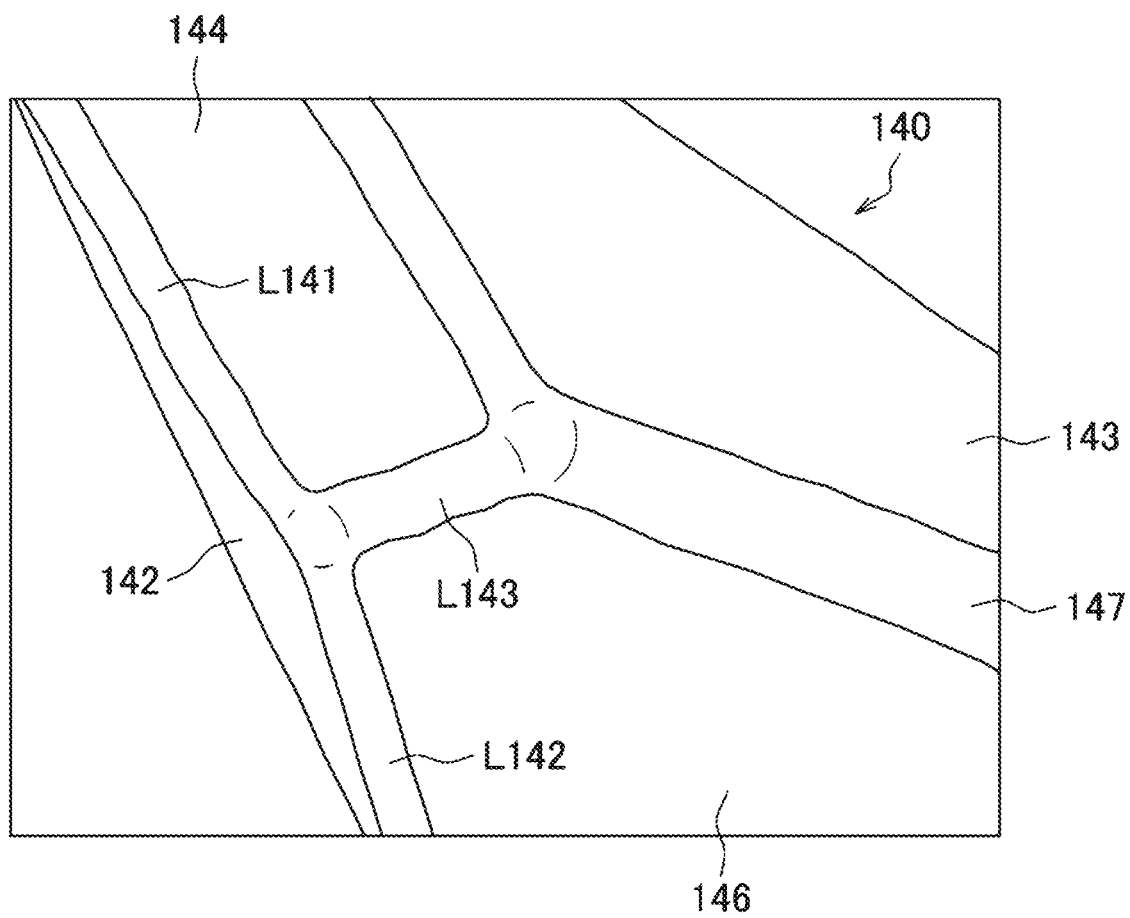
FIG. 13 is an enlarged schematic view (the rake surface side) of Comparative Example 4 (drill 140) to be compared with the first embodiment.
Figure 14:
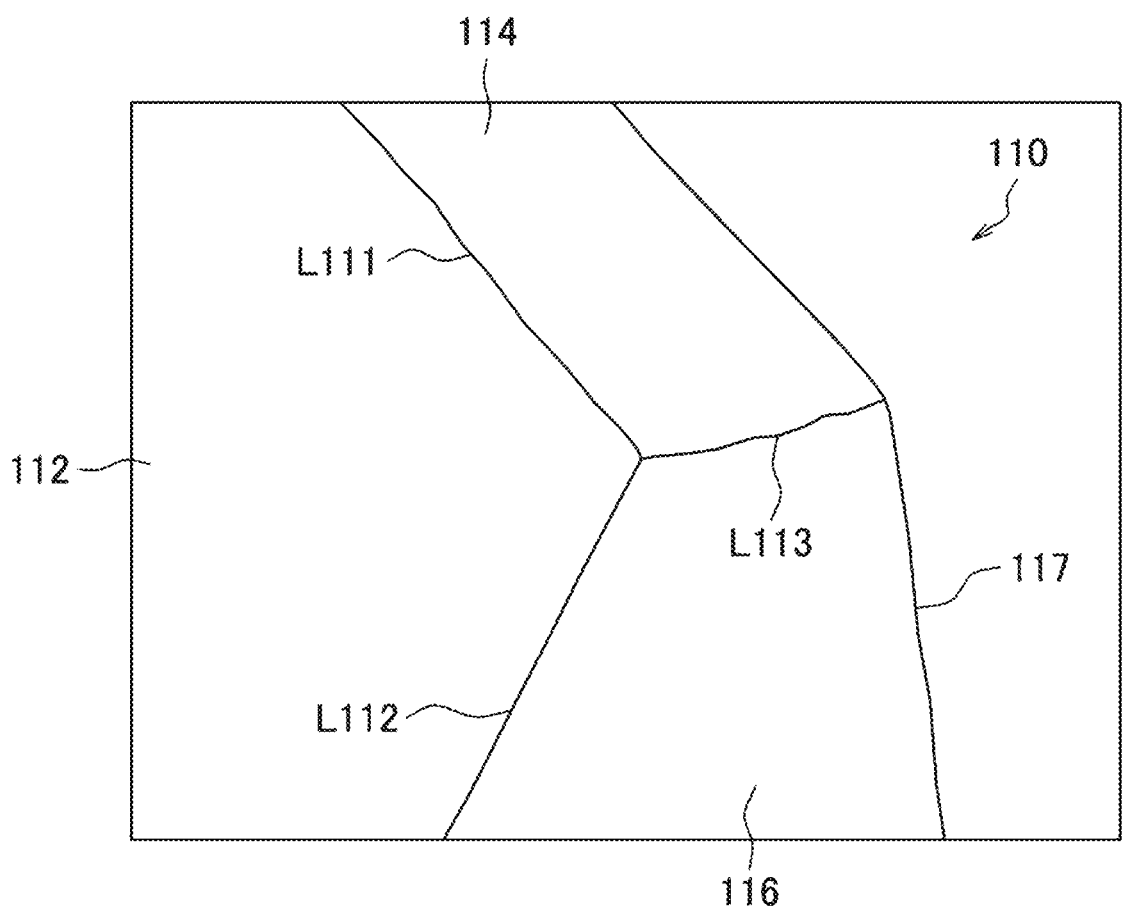
FIG. 14 is an enlarged schematic view (the flank surface side) of Comparative Example 1 (drill 110) to be compared with the first embodiment.
Figure 15:
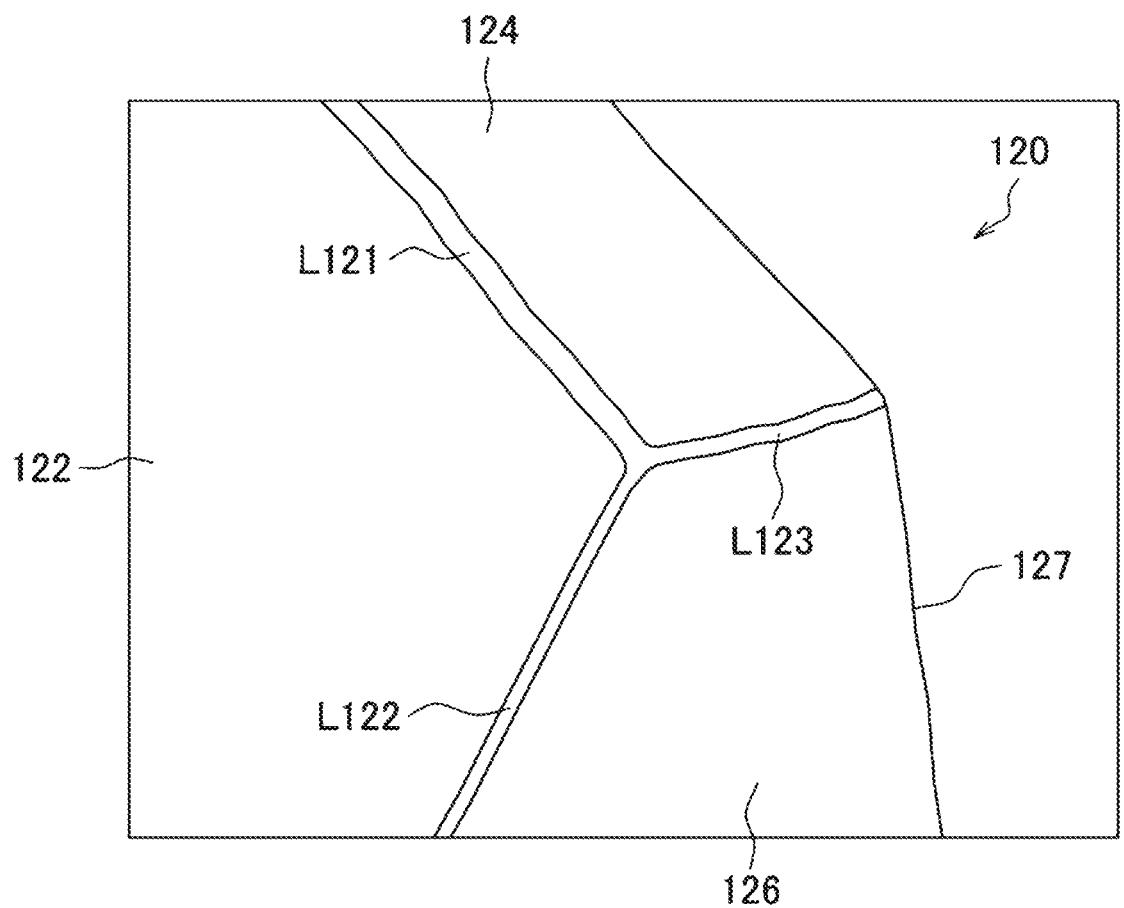
FIG. 15 is an enlarged schematic view (the flank surface side) of Comparative Example 2 (drill 120) to be compared with the first embodiment.
Figure 16:
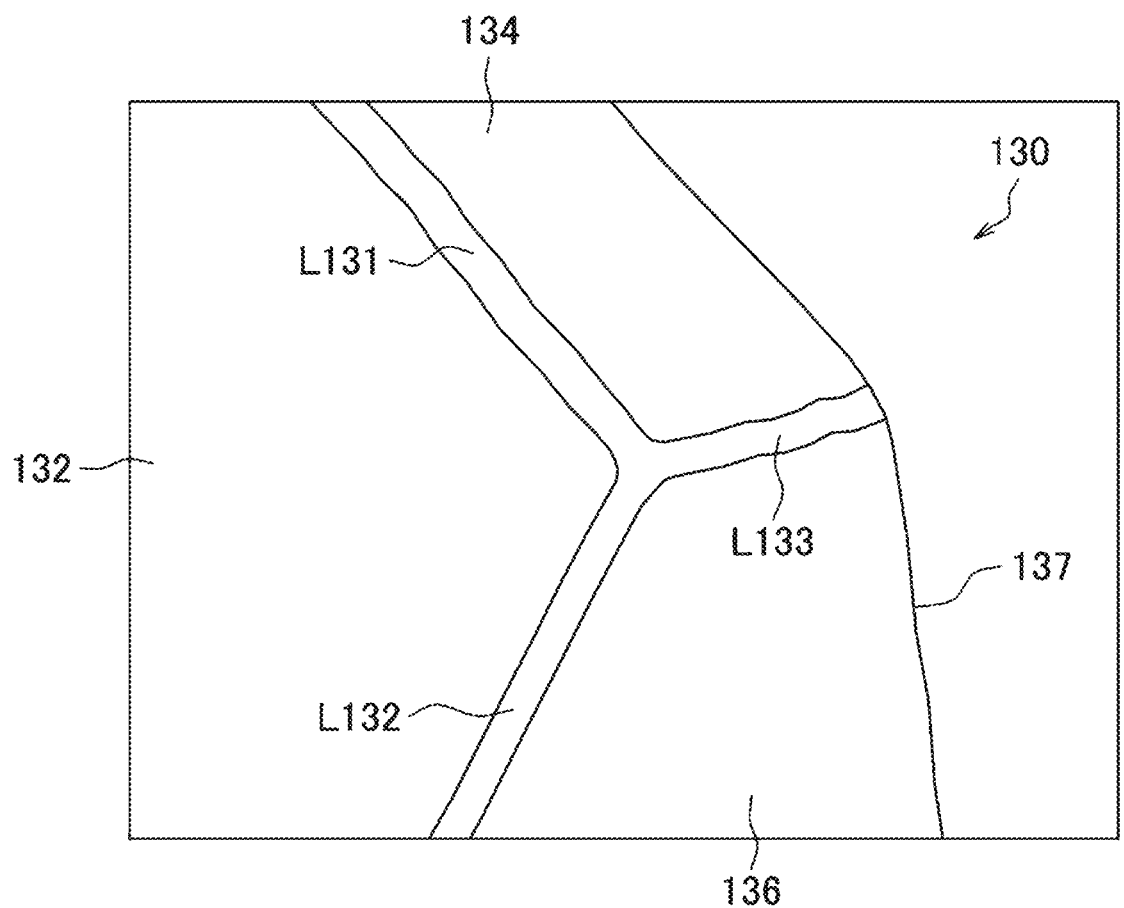
FIG. 16 is an enlarged schematic view (the flank surface side) of Comparative Example 3 (drill 130) to be compared with the first embodiment.
Figure 17:
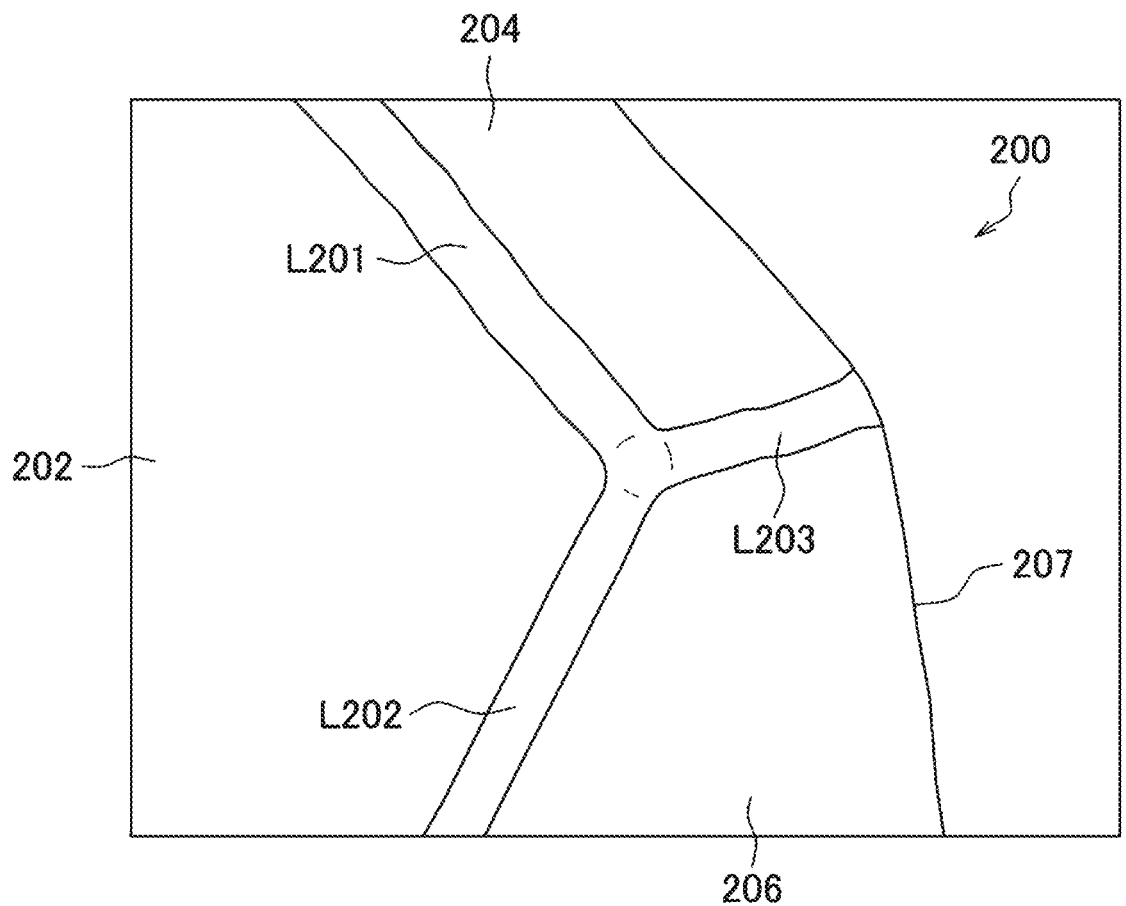
FIG. 17 is an enlarged schematic view (the flank surface side) of Example 1 (drill 200) of the first embodiment.
Figure 18:
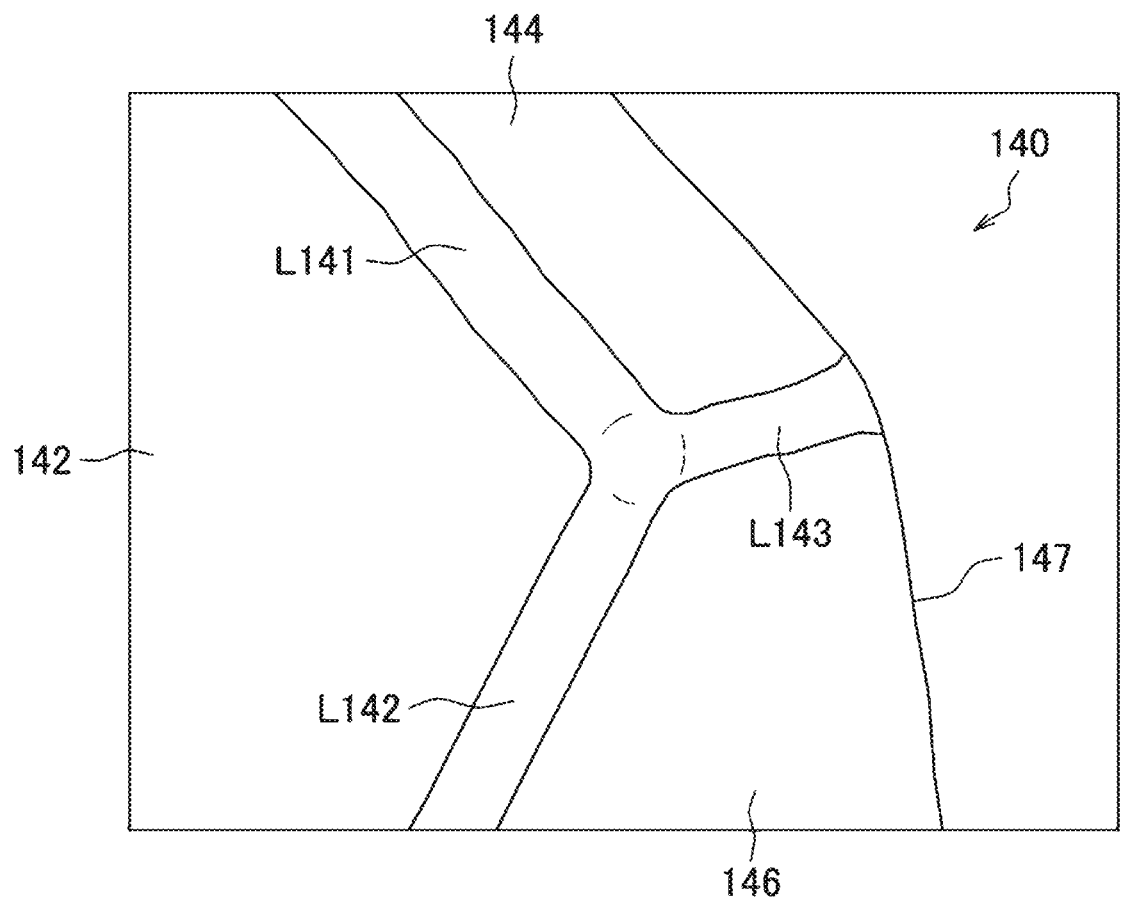
FIG. 18 is an enlarged schematic view (the flank surface side) of Comparative Example 4 (drill 140) to be compared with the first embodiment.
Figure 19:
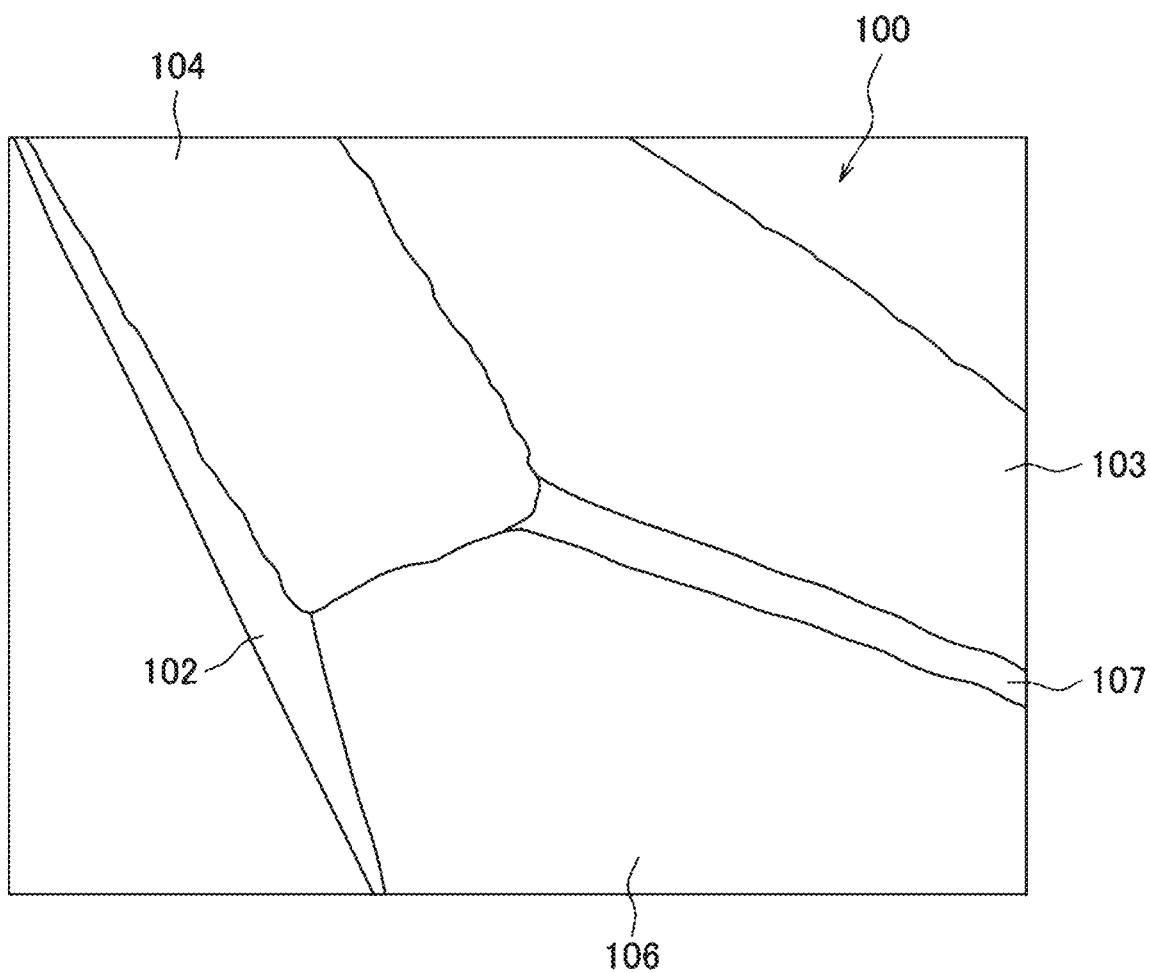
FIG. 19 is an enlarged schematic view of the vicinity of a cutting edge of a conventional drill 100.
Figure 20:
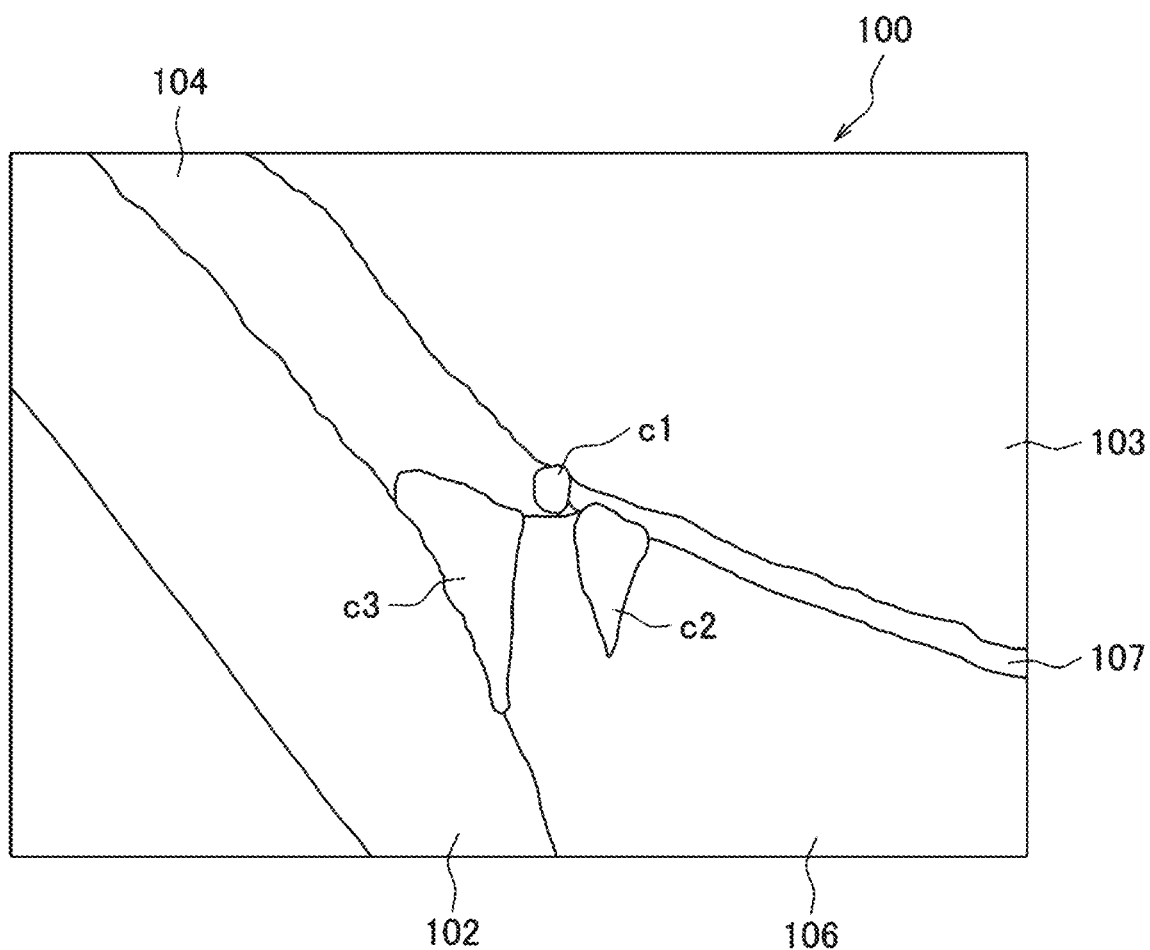
FIG. 20 is an enlarged schematic view illustrating a chipped state of the conventional drill 100.

FIG. 12 illustrates the form, as viewed from the rake surface side, of Example 1 (drill 200) after round-chamfering (before being coated with the hard film) as a representative of Examples 1 to 3, and similarly FIG. 17 illustrates the form as viewed from the flank surface side.

FIGS. 9 to 11 and 13 illustrate the forms, as viewed from the rake surface side, of Comparative Examples 1 to 4 (drills 110 to 140) after round-chamfering (before being coated with the hard film), respectively, and similarly FIGS. 14 to 16 and 18 illustrate the forms as viewed from the flank surface side.

In Comparative Example 1, round processing was performed only on a leading edge (ridgeline 117 illustrated in FIG. 9) of the drill body, and the drill body was coated with an existing hard film (exceeding 2500 HV in hardness). The radii $r_1$ to $r_3$ of curvature of the first to third ridgelines in Examples 1 to 3 and Comparative Examples 1 to 4 were measured using a three-dimensional measurement device.

Furthermore, the hardness of the hard film was measured using a micro-Vickers hardness meter, and adjustments based on JIS Z2244 "Hardness test on the curved surface" were made as needed.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| $r_1$ | 18 μm | 21 μm | 25 μm | 5 μm | 9 μm | 16 μm | 31 μm |
| $r_2$ | 43 μm | 51 μm | 58 μm | 7 μm | 10 μm | 28 μm | 49 μm |
| $r_3$ | 35 μm | 38 μm | 40 μm | 8 μm | 16 μm | 30 μm | 47 μm |
| Hard film thickness | 2.8 μm | 4.2 μm | 3.7 μm | 2.7 μm | 3.2 μm | 3.2 μm | 4.7 μm |
| Hard film hardness | 2360 HV | 2280 HV | 2100 HV | 2650 HV | 2200 HV | 2340 HV | 2400 HV |

As for the drills used in the cutting tests, as illustrated in FIGS. 9 to 18, a flank surface 202, a rake surface 203, a region 204, a margin 206 and a leading edge 207 of the drill 200 of Example 1 correspond to flank surfaces 112 to 142, rake surfaces 113 to 143, regions 114 to 144, margins 116 to 146 and leading edges 117 to 147 of the drills 110 to 140 of Comparative Examples 1 to 4, respectively.

A first ridgeline L201, a second ridgeline L202 and a third ridgeline L203 of the drill 200 of Example 1 correspond to first ridgelines L111 to 141, second ridgelines L112 to 142 and third ridgelines L113 to 143 of the drills 110 to 140 of Comparative Examples 1 to 4, respectively.

As the hard film coating, in both Examples 1 to 3 and Comparative Examples 1 to 4, the lowermost layer (the first layer) of the hard film of AlTiN (with an atomic ratio of Al:Ti=60:40), the intermediate layer (the second layer) that is the mixed layer formed by the first intermediate hard film composed of TiAlSiN (with an atomic ratio of Ti:Al:Si=62.5:30:7.5) and the second intermediate layer composed of TiAlCrSiN (with an atomic ratio of Ti:Al:Cr:Si=42.5:35:15:7.5), and the uppermost layer (the third layer) of the hard film of TiSiN (with an atomic ratio of Ti:Si=85:15) were stacked in this order from the drill body.

The cutting tests were performed under the following conditions, and, in each of Examples 1 to 3 and Comparative Examples 1 to 4, the cutting test was ended upon confirmation of a chip in the cutting edge, the outer peripheral corner, etc., and the total cut lengths (in m) until the end of the tests were compared.

Rotational speed of drill: 5300 rev/min
Feed rate of drill: 795 mm/min
Cutting speed of drill: 100 m/min
Feed amount of drill: 0.150 mm/rev
Work material: Carbon steel S50C (0.5% C)
Processing form: Blind hole with a depth of 30 mm
Cooling condition: External supply of water-soluble cutting oil The results of the cutting tests are explained.

At the time when the total cut length after starting hole drilling reached 43 m in Comparative Example 1, and similarly at the time when the total cut length reached 60 m in Comparative Example 2, 94 m in Comparative Example 3, or 103 m in Comparative Example 4, the outer peripheral corner chipped, and cutting was ended at these times.

In contrast, at the time when the total cut length after starting hole drilling reached 140 m in Example 1, and similarly at the time when the total cut length reached 156 m in Example 2, or 134 m in Example 3, the outer peripheral corner chipped, and cutting was ended at these times.

When the diameter of the drill body used in the first embodiment was 6 mm and substituted in Formulas 1 to 3 described above, the radii $r_1$, $r_2$ of curvature of the first and second ridgelines and the thickness $t_1$ of the hard film were $r_1$=12.7 to 27.7 μm, $r_2$=42.7 to 70.9 μm, and $t_1$=2.13 to 4.43 μm.

In Comparative Examples 1 to 3, one of the radii of curvature of the first ridgeline and the second ridgeline was smaller than the above-described range, and, in Comparative Example 4, the radii of curvature of the first ridgeline and the second ridgeline both exceeded the above-described range.

In Comparative Example 4, the thickness of the hard film also exceeded the above-described range.

From the test results, each of Examples 1 to 3 made it possible to increase the total cutting length 1.3 times or more relative to Comparative Examples 1 to 4, and to extend the tool life.

It is considered that this was achieved due to the fact that the radii $r_1$, $r_2$ of curvature of the first and second ridgelines and the thickness $t_1$ of the hard film in each of Examples 1 to 3 were all within the ranges of Formulas 1 to 3.

Second Embodiment

Next, cutting tests using two types of drills of an example and a comparative example were performed to confirm the relationship between the hardness and the thickness of the hard film and the tool life, and the test results are explained.

In each example and comparative example, similarly to the first embodiment, after performing round-chamfering to various degrees on the drill body made of a cemented carbide, the drill body was coated with a hard film.

The example and the comparative example had common specifications: drill body diameter: 2 mm; drill groove length: 15 mm; and drill length: 49 mm.

The radii $r_1$ to $r_3$ of curvature (the radii of curvature of the round chamfer) of the first to third ridgelines and the thickness and the hardness of the hard film in Examples 11 and 12 and Comparative Examples 11 to 13 were as shown in Table 2. The radii $r_1$ to $r_3$ of curvature of the first to third ridgelines in Examples 11 and 12 and Comparative Examples 11 to 13 were measured using the three-dimensional measurement device similarly to the first embodiment.

The hardness of the hard film was measured using the micro-Vickers hardness meter, and adjustments based on JIS Z2244 "Hardness test on the curved surface" were made as needed.

The hard film coated on the drill body had the same chemical composition as in the first embodiment.

TABLE 2

|  | Example 11 | Example 12 | Comparative Example 11 | Comparative Example 12 | Comparative Example 13 |
|---|---|---|---|---|---|
| $r_1$ | 24 μm | 15 μm | 19 μm | 20 μm | 28 μm |
| $r_2$ | 43 μm | 63 μm | 45 μm | 48 μm | 53 μm |
| $r_3$ | 27 μm | 45 μm | 20 μm | 32 μm | 42 μm |
| Hard film thickness | 3.1 μm | 1.4 μm | 3.7 μm | 2.7 μm | 2.4 μm |
| Hard film hardness | 2330 HV | 2160 HV | 2380 HV | 2530 HV | 2240 HV |

The cutting tests were performed under the following conditions, and, in each of Examples 11 and 12 and Comparative Examples 11 to 13, the cutting test was ended upon confirmation of a chip at the cutting edge, the outer peripheral corner, etc., and the total cut lengths (in m) until the end of the tests were compared.

In Comparative Example 11 and 12, although self-destruction of the film in the form illustrated in FIG. 22 was confirmed in a part of the hard film when coating the drill body with the hard film, the two drills of Comparative Examples 11 and 12 underwent the cutting tests in such a state.

Rotational speed of drill: 12739 rev/min
Feed rate of drill: 637 mm/min
Cutting speed of drill: 80 m/min
Feed amount of drill: 0.05 mm/rev
Work material: Carbon steel S50C (0.5% C)
Processing form: Blind hole with a depth of 10 mm
Cooling condition: External supply of water-soluble cutting oil The results of the cutting tests are explained.

At the time when the total cut length after starting hole drilling reached 35 μm in Comparative Example 11, 47 μm in Comparative Example 12, or 59 μm in Comparative Example 13, the outer peripheral corner chipped, and cutting was ended at these times.

In contrast, at the time when the total cut length after starting hole drilling reached 94 m in Example 11, and similarly at the time when the total cut length reached 82 μm in Example 12, the outer peripheral corner chipped, and cutting was ended at these times.

When the diameter of the drill body used in the second embodiment was 2 mm and substituted in Formulas 1 to 3 described above, the radii $r_1$, $r_2$ of curvature of the first and second ridgelines and the thickness $t_1$ of the hard film were $r_1$=10.9 to 25.9 μm, $r_2$=40.3 to 68.3 μm, and $t_1$=1.25 to 3.55 μm.

In Comparative Examples 11, the thickness of the hard film exceeded the above-described range, and, in Comparative Example 12, the hardness of the hard film was similar to the existing hardness and exceeded 2500 HV.

Therefore, in each of Comparative Examples 11 and 12, since self-destruction appeared in a part of the hard film before the test as described above, the result of the total cut length in this test was poor compared with Examples 11 and 12.

In Comparative Example 13, the radius of curvature of the first ridgeline exceeded the above-described range and the adhesion of the hard film to the drill base material decreased, and therefore, similarly, the result of the total cut length in this test was poor compared with the examples.

From the test results, each of Examples 11 and 12 made it possible to increase the cutting length 1.3 times or more relative to Comparative Examples 11 to 13, and to extend the tool life.

It is considered that this was achieved due to the fact that the hardness of the hard film was within a range of 2000 to 2500 HV and the thickness of the hard film was within the range of Formula 3, in addition to the fact that the radii of curvature of the first and second ridgelines were within the ranges of Formulas 1 and 2 described above, in each of Examples 11 and 12.

INDUSTRIAL APPLICABILITY

The hard-film-coated drills according to the disclosure have excellent adhesion between the drill base material and the hard film, thereby contributing to improving cutting quality and extending the tool life in the field of cutting tools.

What is claimed is:

1. A hard-film-coated drill having a drill body with a surface coated with a hard film, the drill body being made of a cemented carbide and having two or more cutting edges, a flank surface, a rake surface, and a margin,
    wherein the drill body is provided with a chamfered surface adjacent to the flank surface and the rake surface,
    a surface hardness of the hard film is within a range of 2000 to 2500 HV in Vickers hardness,
    a first ridgeline where the chamfered surface and the flank surface intersect and a second ridgeline where the flank surface and the margin intersect are formed in a round shape in cross section,
    a radius $r_1$ (in μm) of curvature of the round shape of the first ridgeline is within a range represented by a formula $r_1 = 0.45 \times D + a_1$ ($10 \leq a_1 \leq 25$), where D is a diameter (in mm) of the drill body and $a_1$ is a constant (in μm) to keep $r_1$ within an upper limit and a lower limit, and
    a radius $r_2$ (in μm) of curvature of the round shape of the second ridgeline is within a range represented by a formula $r_2 = 0.65 \times D + a_2$ ($39 \leq a_2 \leq 67$), where $a_2$ is a constant (in μm) to keep $r_2$ within an upper limit and a lower limit,
    wherein the hard film includes a first layer formed of a first hard film containing a nitride that includes Al and Ti, a second layer formed by alternately stacking second and third hard films having different compositions, and a third layer formed of a fourth hard film containing a nitride that includes Ti and Si, and the first to third layers are stacked in this order from a drill body side, and
    wherein the second hard film contains a nitride that includes Ti, Al and Si, and the third hard film contains a nitride that includes Ti, Al, Cr and Si.

2. The hard-film-coated drill according to claim 1, wherein a thickness $t_1$ (in μm) of the hard film is within a range represented by a formula $t_1=0.8\times \ln(D)+a_3$ ($0.7 \leq a_3 \leq 3.0$), where $a_3$ is a constant (in μm) to keep $t_1$ within an upper limit and a lower limit.

3. The hard-film-coated drill according to claim 2, wherein the radius $r_1$ of curvature of the round shape of the first ridgeline is within a range of 15 to 35 μm.

4. The hard-film-coated drill according to claim 1, wherein the radius $r_1$ of curvature of the round shape of the first ridgeline is within a range of 15 to 35 μm.

* * * * *